US011134041B1

(12) United States Patent
He

(10) Patent No.: US 11,134,041 B1
(45) Date of Patent: Sep. 28, 2021

(54) SYSTEM AND METHOD FOR INTERACTIVE ONLINE ENTERTAINMENT

(71) Applicant: SHENZHEN SVAKOM TECHNOLOGY CO., LTD, Shenzhen (CN)

(72) Inventor: Minchao He, Shenzhen (CN)

(73) Assignee: SHENZHEN SVAKOM TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 17/087,652

(22) Filed: Nov. 3, 2020

(51) Int. Cl.
G05B 19/02 (2006.01)
H04L 12/58 (2006.01)
H04W 4/20 (2018.01)
H04L 29/08 (2006.01)
H04L 29/06 (2006.01)
A61H 19/00 (2006.01)
G06Q 20/06 (2012.01)
A63F 13/537 (2014.01)
H04W 4/80 (2018.01)
H04L 12/18 (2006.01)
A63F 13/87 (2014.01)

(52) U.S. Cl.
CPC ........... H04L 51/046 (2013.01); A61H 19/00 (2013.01); A63F 13/537 (2014.09); G06Q 20/065 (2013.01); H04L 12/1813 (2013.01); H04L 65/1069 (2013.01); H04L 67/025 (2013.01); H04W 4/20 (2013.01); H04W 4/80 (2018.02); A61H 2201/5012 (2013.01); A63F 13/87 (2014.09)

(58) Field of Classification Search
CPC ...................................................... G05B 19/02
See application file for complete search history.

(56) References Cited

U.S. PATENT DOCUMENTS 9,762,515 B1 9/2017 Olivares et al.

Primary Examiner — Olisa Anwah

(57) ABSTRACT

Disclosed is a system and method for allowing one or more users to interact with models from a distance, for example, by enabling the users to input the models during online video chat sessions, wherein the models can define input parameters and provide at least one interactive interface, receive an interactive result according to the interactive interface to perform predefined acts, via an adult toy, based on the the interactive result received. The adult toy can be Wi-Fi or Bluetooth™ enabled to receive commands directly from the server via a web browser extension, the website hosting an online video chat session, or connect to an application installed on a device operated by the model, wherein the application communicates with the web browser extension to relay commands to the adult toy therefrom. In some embodiments, the interactive interface provides a finger guessing game, a dice game or a lottery game.

20 Claims, 14 Drawing Sheets

SYSTEM AND METHOD FOR INTERACTIVE ONLINE ENTERTAINMENT

FIELD

The present invention generally relates to telecommunications. More particularly, the present invention is directed to methods and systems for interactive online adult entertainment.

BACKGROUND

Chat rooms are widely used to allow two or more users usually located at different locations to communicate. Generally, chat rooms utilize text input by the users that can be displayed in real-time for providing a written transcript of a conversation. Some forms of chatting incorporate video and audio so that two or more users can view some or all of the users from different locations in real-time while conversing.

SUMMARY OF THE INVENTION

In view of the disadvantages inherent in the known types of systems for chat rooms and communication systems now present in the prior art, the present invention provides an improved interactive online communication system for adult entertainment.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Some embodiments include, for example, devices, systems, and methods of providing adult entertainment via online chat sessions and interactive shows.

Some embodiments include a system comprising a server with a memory having stored thereon instructions, and a processor to execute the instructions resulting in a web browser extension or an adult video chatting website for allowing users to interact with models from a distance, for example, by tipping the models during an online video chat session on a website, wherein the models can define input parameters and provide at least one interactive interface, receive an interactive result according to the at least one interactive interface to perform predefined acts, via an adult toy or another stimulation device, based on the interactive result received.

In some embodiments, if the input falls within the input parameters, provides the interactive interface and outputs randomly the interactive result from the interactive interface.

In some embodiments, if the input falls within the input parameters, provides a first interactive interface and a second interactive interface, outputs randomly a first result from the first interactive interface, outputs randomly a second result from the second interactive interface, and outputs randomly the interactive result according to the first result and the second result.

In some embodiments, the interactive interface provides a selected one online game from the group of a finger guessing game, a dice game and a lottery game, the interactive result is randomly generated from a plurality of predefined results according to the online game, the adult toy has a plurality of different modes corresponding to the plurality of predefined results.

In some embodiments, the plurality of modes includes a first mode of no actuating, a second mode of actuating for a first time period at a first actuating speed, a third mode of actuating for a second time period at a second actuating speed, the third mode is different from the second mode, and a fourth mode of actuating for a third time period at the first actuating speed and actuating for a fourth time period at the second actuating speed.

In some embodiments, the input parameters comprise a first range of input value, a second range of input value, and a third range of input value, the input value of the second range are greater than the input value of the first range and less than the input value of the third range, if the tip falls within the input parameters of the first range, the at least one interactive interface provides a first online game from the group of the finger guessing game, the dice game and the lottery game; if the tip falls within said the parameters of the second range, the at least one interactive interface provides a second online game from the group of the finger guessing game, the dice game and the lottery game; and if the input falls within the input parameters of the third range, the at least one interactive interface provides a third online game from the group of the finger guessing game, the dice game and the lottery game.

In some embodiments, in each range of input value, the plurality of predefined results has a plurality of different prizes respectively, and a probability to win a bigger prize from the plurality of different prizes is improved with increase of the input.

In some embodiments, the adult toy is Wi-Fi-enabled or Bluetooth-enabled, the system further includes a model device having an application installed thereon, and the application is configured to send commands to the adult toy to control the adult toy.

In some embodiments, the model device is configured to provide the interactive interface, receive the interactive result from the interactive interface and control the adult toy according to the interactive result.

In some embodiments, the software application includes a link generator for generating a live control link according to the interactive result, the live control link configured to be clicked so as to control the adult toy, further wherein the live control link includes a unique Uniform Resource Locator (URL), the link generator is configured to invalidate previously generated live control link or to build a queue of multiple links.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

Figure 1:
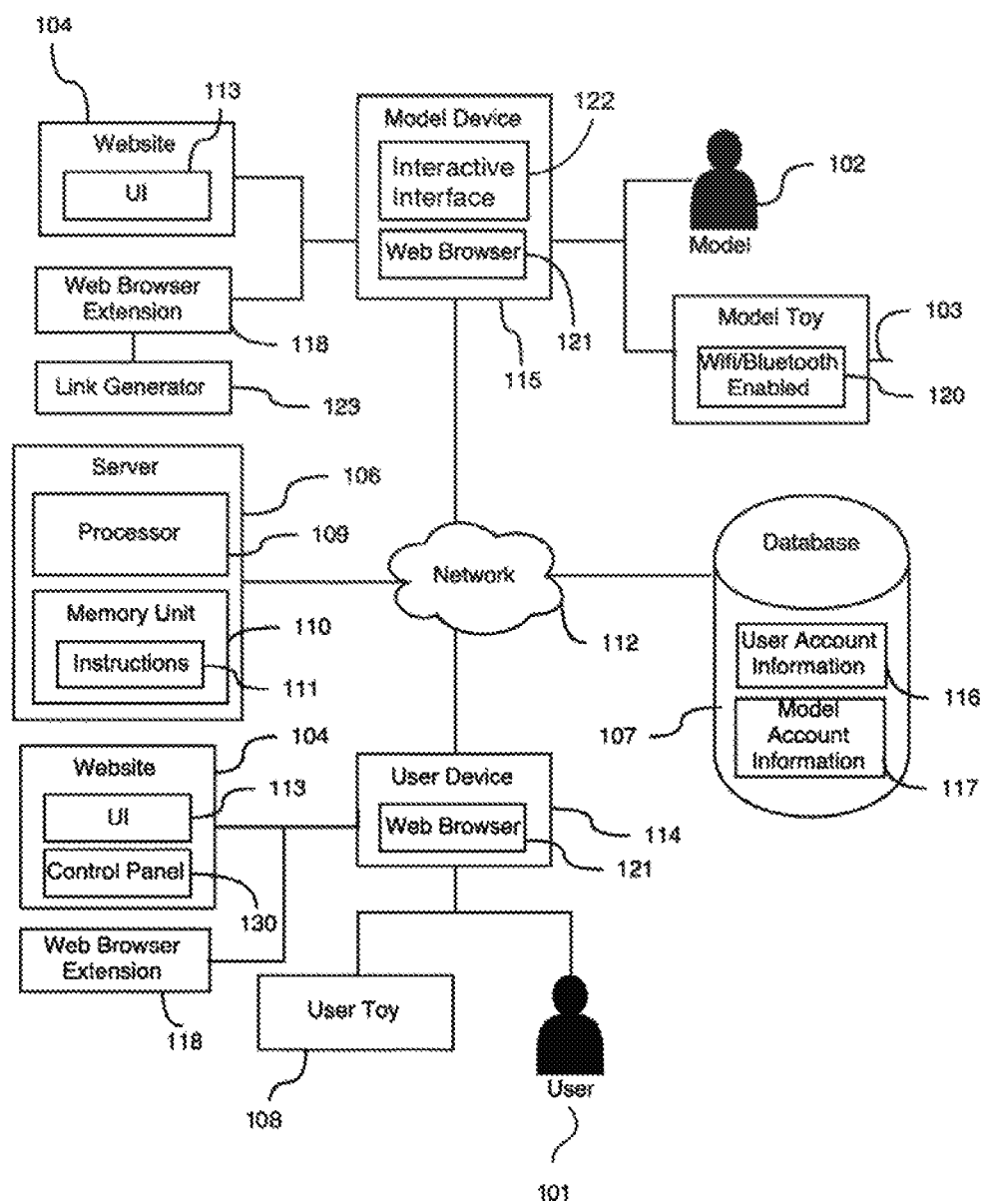
FIGS. 1 through 3 show high-level block diagrams of the present system.

The present invention is directed towards a communication system and method that can actuate adult toys over distances. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or."

Additionally, the articles "a" and "an" as used in this application and the appended claims should generally be construed to mean "one or more" or "at least one" unless specified otherwise or clear from context to be directed to a singular form. Similarly, the terms "plurality" and "a plurality" as used herein includes, for example, "multiple" or "two or more." For example, "a plurality of items" includes two or more items. As used herein, the terms "user," "users," "end user," "end users," "audience," "client," "clients," "customer," and "customers" are interchangeable unless the context clearly suggests otherwise. Similarly, as used herein, the terms "model," "models," "performer," "performers," are used interchangeably unless the context clearly suggests otherwise. The terms "web browser extension," "browser extension," and "website" are used interchangeably unless the context clearly suggests otherwise. Furthermore, the foregoing terms "web browser extension," "browser extension," and "website" may be collectively referred to as "application," "software," or "software application."

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Figure 2:
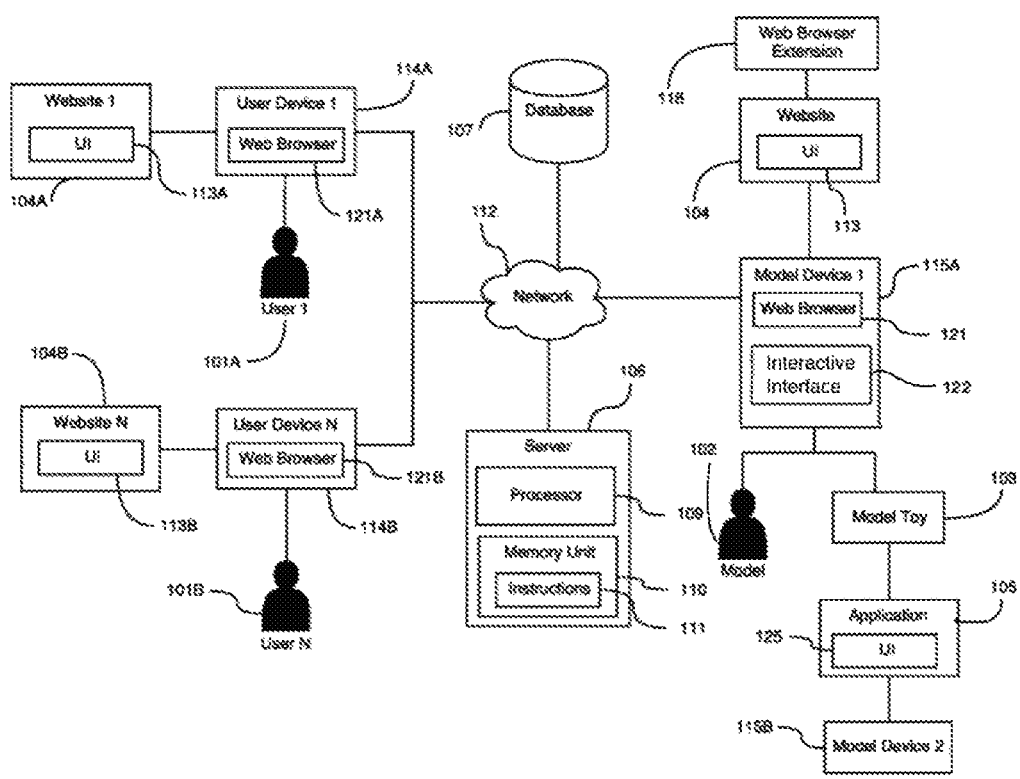

Referring now to FIGS. 1 and 2, there are shown high-level block diagrams of the present system in accordance with some embodiments of the present invention. In one embodiment, the present invention includes a user device 114 that is operated by a user 101, wherein the user device 114 includes a wide variety of computer systems and/or a terminal that allow the user 101 to access a web browser 121 on which the user 101 can access a website 104 to engage in an online chat with a model 102 via a user interface (UI) 113 of the website 104. In this regard, the device 114 may be implemented using suitable hardware components and/or software components, for example, processors, controllers, memory units, storage units, input units, output units, communication units, operating systems, applications, or the like.

The present system further includes a model device 115 that is operated by a model 102. The model device 115 also includes a variety of computer systems and/or a terminal that allow the model 102 to access a web browser 121 on which the model 102 can access the website 104 to engage in an online chat with the user 101 via a UI 113 of the website 104. In this regard, the device 114 may be implemented using suitable hardware components and/or software components, for example, processors, controllers, memory units, storage units, input units, output units, communication units, operating systems, applications, or the like.

In some embodiments, the model device 115 includes an application 105 (e.g., non-downloadable or downloadable mobile application, web application, mobile application) stored thereon. Alternatively, the model 102 includes a second model device 115 B having the application 105 installed thereon. The application 105 communicates with the model toy 103 so as to send commands thereto (FIG. 2), wherein the model toy 103 includes various types of adult toys and stimulation devices. It is contemplated that the application 105 includes a UI 125 for manually controlling the model toy 103, for example, by transmitting signals to turn the model toy 103 on and off and vibrate the model toy 103. In other embodiments, however, it is contemplated that the model toy 103 is Wi-Fi or Bluetooth™ enabled 120 (or enabled via other suitable short-range wireless interconnection) so as to allow the model toy 103 to directly communicate with the web browser 121 via the model device 115 (FIG. 1) and receive commands therefrom without the application 105 when the model toy 103 is turned on. In this regard, the model toy 103 is configured to receive signals from the model device 115 and/or the web browser 121. In some embodiments, the system further includes a user toy 108 (i.e., Wi-Fi-enabled or Blutooth™ enabled) that can communicate with the web browser extension 118 of the web browser 121 on the user device 114. It is contemplated that the user toy 108 operates similarly to the model toy 103.

The website 104 is configured to allow the user 101 and the model 102 to set up a user account and a model account, respectively. In this regard, the user 101 can create his or her user name and password and input payment information, among other types of information associated with the user. Similarly, the model 102 can create a model account by inputting the model's name, age, gender, location, and the like. The user account information 116 and the model account information 117 are stored in a database 107 that is connected to the network 112 of the present system.

The user 101 can select a model 102 from a group of models to enter into an online chat session, via the website 104. In this regard, the chat session can be a private (i.e., one-on-one) session, a group session (i.e., limited number of users and one model), or a public session (i.e., unlimited number of users). Each model 102 can define and edit input parameters that are used during each chat session. In one embodiment, the website 104 allows the model to designate specific input value and/or ranges of input value and designate to enter an interactive interface when tip from the user 101 falls within input value and/or ranges of input value. In this regard, the website 104 is configured to recognize input value and send an interactive command to the model device 115 such that the model device 115 provides an interactive interface 122, receives an interactive result from the interactive interface 122 and controls the adult toy 103 actuate according to the interactive result. In another embodiment, the website 104 can be configured to recognize input value and provide an interactive interface, receive an interactive result from the interactive interface and control the adult toy 103 actuate according to the interactive result via the model device 115.

In the embodiment, the input may be a tip from users. The input value may be the tip amounts, and the input parameters may be the tip parameters.

Figure 3:
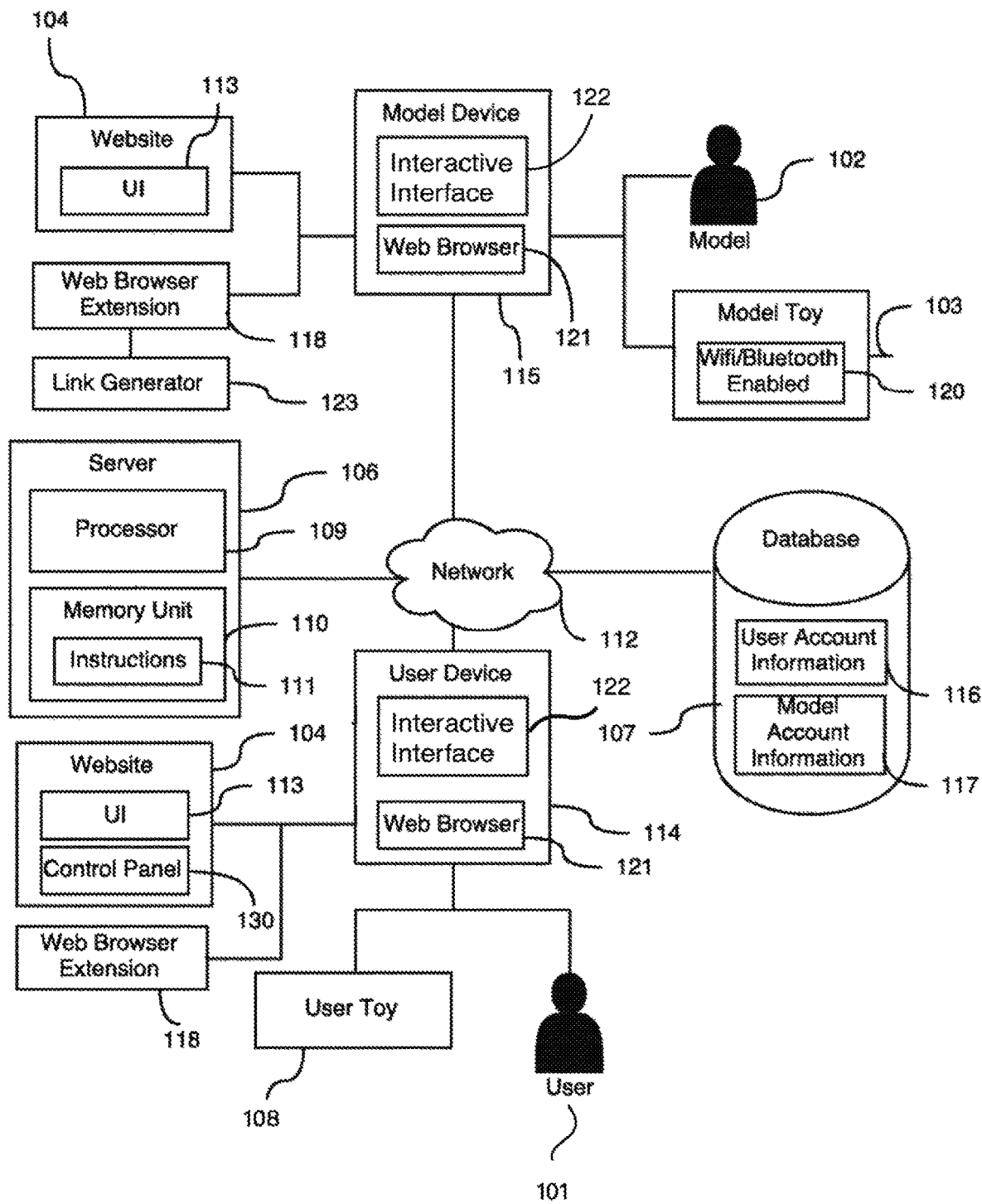

Referring to FIG. 3, in other embodiment, the website 104 is configured to recognize input value and send an interactive command to the model device 115 and the user device 114 such that the model device 115 provides a first interactive interface 122 and the user device 114 provides a second interactive interface 122. Further, the model device 115 outputs a first result from the first interactive interface 122, the user device 114 outputs a second result from the second interactive interface 122, the website 104 outputs randomly an interactive result according to the first result and the second result, and controls the adult toy 103 actuate according to the interactive result.

It can be understood, the website 104 determines whether the input from the user 101 falls within the one or more ranges, if the input falls within the one or more ranges of the input parameters, the interactive interface 122 is provided, and if the input does not fall within the one or more ranges of the input parameters, the interactive interface is not provided. In addition, the interactive result from the interactive interface may be generated from a click operation or a touch operation on the interactive interface by the model 102. For example, the ranges of tip parameters may be defined as a first range of tip amounts 1~10 tokens, a second range of tip amounts 11~20 tokens, a third range of tip amounts 21~30 tokens, and a fourth range of tip amounts greater than 31 tokens.

Figure 4:
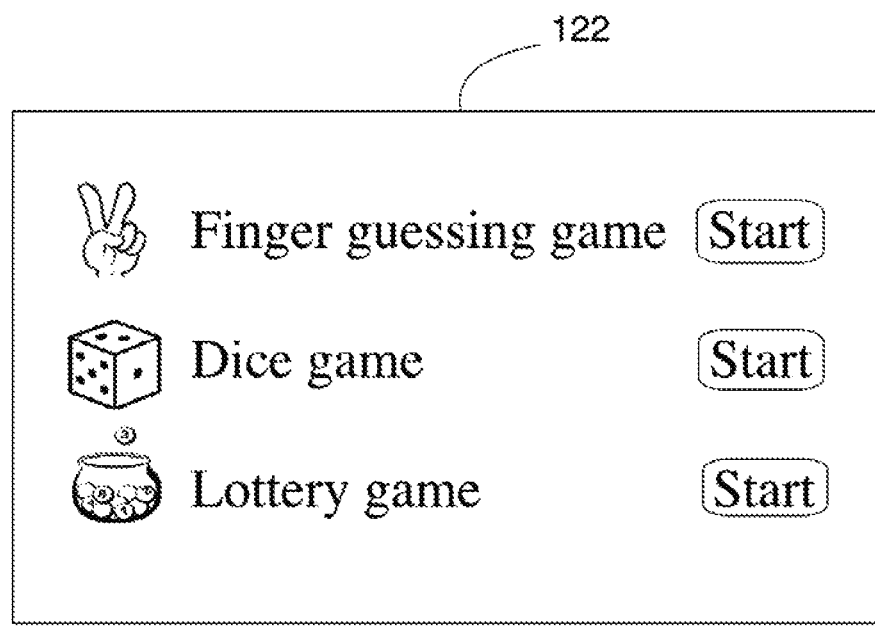
FIG. 4 shows an interactive interface provided by the present system.

Referring to FIG. 4, in some embodiments, the interactive interface provides a selected one online game from the group of a finger guessing game, a dice game and a lottery game. The interactive result can be randomly generated from a plurality of predefined results according to the online game. The adult toy 103 has a plurality of different modes corresponding to the plurality of predefined results. The plurality of modes includes a first mode of no actuating, a second mode of actuating for a first time period at a first actuating speed, a third mode of actuating for a second time period at a second actuating speed, the third mode is different from the second mode and a fourth mode of actuating for a third time period at the first actuating speed and actuating for a fourth time period at the second actuating speed. In one embodiment, the first time period is 5 seconds, the second time period is 5 seconds, the third time period is 10 seconds, and the fourth time period is 10 seconds. The first actuating speed can be less than the second actuating speed.

In one embodiment, the interactive interface provides a finger guessing game, predefined results may include "Rock", "Paper", and "Scissors". If the interactive result is "Scissors", the corresponding mode is the second mode, the model device 115 controls the adult toy 103 actuate for the first time period in the first actuating speed. If the interactive result is "Rock", the corresponding mode is the third mode, the model device 115 controls the adult toy 103 actuate for the first time period in the second actuating speed. If the interactive result is Paper, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of "Rock", "Paper", and "Scissors" or the predefined results with the order of "Scissors", "Rock", and "Paper". Alternatively, the interactive result also can be randomly selected from the predefined results of "Rock", "Paper", and "Scissors" by invoking a random function.

In one embodiment, the interactive interface provides a dice game, the predefined results may include numbers 1~6. If the interactive result is number 1, the corresponding mode is the first mode, the model device 115 controls the adult toy 103 no actuating. If the interactive result is number 2, the corresponding mode is the second mode, the model device 115 controls the adult toy 103 actuate for the first time period in the first actuating speed. If the interactive result is number 3, the corresponding mode is the third mode, the model device 115 controls the adult toy 103 actuate for the first time period in the second actuating speed. If the interactive result is number 6, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of number 1, number 5, number 3, number 4, number 6, and number 2. Alternatively, the interactive result also can be randomly selected from the predefined results of numbers 1~6 by invoking a random function.

In one embodiment, the interactive interface provides a lottery game, the predefined results may include grand prize, first prize, second prize, third prize and no prize. If the interactive result is no prize, the corresponding mode is the first mode, the model device 115 controls the adult toy 103 no actuating. If the interactive result is the second prize, the corresponding mode is the second mode, the model device 115 controls the adult toy 103 actuate for the first time period in the first actuating speed. If the interactive result is the first prize, the corresponding mode is the third mode, the model device 115 controls the adult toy 103 actuate for the first time period in the second actuating speed. If the interactive result is the grand prize, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of the third prize, no prize, the second prize, the third prize, the grand prize, and the first prize. Alternatively, the interactive result also can be randomly selected from the predefined results of grand prize, first prize, second prize, third prize and no prize by invoking a random function.

As previously mentioned, the ranges of tip parameters may be defined as a first range of tip amounts 1~10 tokens, a second range of tip amounts 11~20 tokens, a third range of tip amounts 21~30 tokens, and a fourth range of tip amounts greater than 31 tokens. The tip amounts of the second range are greater than the tip amounts of the first range and less than the tip amounts of the third range, and the tip amounts of the fourth range are greater that the tip amounts of the third range. In one embodiment, if said tip falls within said tip parameters of the first range, the at least one interactive interface provides a first online game from the group of the finger guessing game, the dice game and the lottery game; if said tip falls within said tip parameters of the second range, the at least one interactive interface provides a second online game from the group of the finger guessing game, the dice game and the lottery game; and if said tip falls within said tip parameters of the third range, the at least one interactive interface provides a third online game from the group of the finger guessing game, the dice game and the lottery game.

For example, if said tip falls within said tip parameters of the first range, the at least one interactive interface provides the finger guessing game; if said tip falls within said tip parameters of the second range, the at least one interactive interface provides the dice game; and if said tip falls within said tip parameters of the third range, the at least one interactive interface provides the lottery game.

Furthermore, in each range of tip amounts, a probability to win a bigger prize from the plurality of different prizes is improved with increase of the tip from the user 101.

In the finger guessing game, if a first tip from the user 101 falls within the first range of tip amounts 1~10 tokens and a second tip from the user 101 greater than the first tip falls within the first range of tip amounts 1~10 tokens, a probability to win a bigger prize (such as a predefined results "Paper") of the second tip is greater than a probability to win a bigger prize (such as a predefined results "Paper") of the first tip, such as a probability to receive a predefined results "Paper" of the second tip may be 50% and a probability to receive a predefined results "Paper" of the first tip may be 20%, a probability to win another predefined results except "Paper" of the second tip may be 50% and a probability to win another predefined results except "Paper" of the first tip may be 80%. It can be understood, in one embodiment, the second tip and the first tip may corresponds to different predefined results, such as the predefined results corresponding to the second tip may be "Paper", "Rock", "Paper", and "Scissors", and the predefined results corresponding to the first tip may be "Paper", "Rock", "Scissors", "Rock" and "Scissors".

In the dice game, if a first tip from the user 101 falls within the first range of tip amounts 1~10 tokens and a second tip from the user 101 greater than the first tip falls within the first range of tip amounts 1~10 tokens, a probability to win a bigger prize (such as a predefined results of number 6) of the second tip is greater than a probability to win a bigger prize (such as a predefined results of number 6) of the first tip, such as a probability to receive the predefined results of number 6 of the second tip may be 50% and a probability to receive the predefined results of number 6 of the first tip may be 20%, a probability to win another predefined results except "number 6" of the second tip may be 50% and a probability to win another predefined results except "number 6" of the first tip may be 80%. It can be understood, in one embodiment, the second tip and the first tip may corresponds to different predefined results, such as the predefined results corresponding to the second tip may be "number 6", "number 1", "number 6", "number 2" "number 6" and "number 3", and the predefined results corresponding to the first tip may be "number 6", "number 1", "number 2", "number 3", and "number 4".

For example, in the lottery game, if a first tip from the user 101 falls within the first range of tip amounts 1~10 tokens and a second tip from the user 101 greater than the first tip falls within the first range of tip amounts 1~10 tokens, a probability to win a bigger prize of the second tip is greater than a probability to win a bigger prize of the first tip, such as a probability to win the grand prize of the second tip may be 50% and a probability to win the grand prize of the first tip may be 20%, a probability to win another prize except the grand prize of the second tip may be 50% and a probability to win another prize except the grand prize of the first tip may be 80%. It can be understood, in one embodiment, the second tip and the first tip may corresponds to different predefined results, such as the predefined results corresponding to the second tip may be "grand prize", "first prize", "grand prize", "second prize", "grand prize" "third prize", "grand prize" and "no prize", and the predefined results corresponding to the first tip may be "grand prize", "first prize", "second prize", "third prize", "no prize" and "third prize".

Referring to FIG. 3 and FIG. 4, the website 104 is configured to recognize tip amounts and send an interactive command to the model device 115 and the user device 114 such that the model device 115 provides the first interactive interface 122 and the user device 114 provides the second interactive interface 122. The first interactive interface 122 and the second interactive interface 122 provide the same online game, such as the finger guessing game, the dice game and the lottery game. Further, the model device 115 outputs the first result from the first interactive interface 122, the user device 114 outputs the second result from the second interactive interface 122, the website 104 outputs randomly the interactive result according to the first result and the second result, and controls the adult toy 103 actuate according to the interactive result. For example, in the finger guessing game, if the first result is "Rock" and the second result is "Paper" the website 104 outputs the interactive result of "Paper" and controls the adult toy 103 actuate according to the interactive result of "Paper". If the first result is "Scissor" and the second result is "Paper" the website 104 outputs the interactive result of "Scissor" and controls the adult toy 103 actuate according to the interactive result of "Scissor".

It is noted that as used herein, the terms "actuate" mean the model's performances, the model's use of the model toy 103 and/or the operation of the model toy 103 (e.g., vibrating, rotating, thrusting, oscillating, stretching, electric current stimulating, a combination of at least two performances from vibrating, rotating, thrusting, oscillating, stretching, electric current stimulating etc.).

The UI 113 of the website 104 is an interface between the user 101 and one or more elements of the present system (e.g., the website 104), the web browser extension 118, or between the model 102 and one or more elements of the present system. In this regard, the UI 113 of the website 104 allows the user 101 and the model 102 to input and receive messages in a textual format so as to have a live conversation with each other (e.g., in an online chat room). Additionally, the website 104 is further configured to provide a UI 113 comprising audio and video (i.e., during an online video chat session) so that the user 101 can view and listen to the model 102 during a chat session. In some embodiments, the present invention may include other downloadable and/or a non-downloadable software application (e.g., a web application, a mobile application) in lieu of the website 104.

The server 106 includes a memory unit 110 having instructions 111 stored thereon, and a processor 109, wherein the processor 109 is configured to execute the instructions 111 resulting in a software such as the web browser extension 118 or the website 104, wherein the web browser extension 118 or the website 104 is configured to scan for tips during chat sessions and receive tips from the user 101. The web browser extension 118 or the website 104 can determine whether the received tip falls within one of the tip parameters defined by the model 102 and whether the interactive interface is provided.

It is contemplated that the user 101 can purchase credits, points, or other types of virtual currency such as tokens that can be credited to his or her account 116 and use the virtual currency to tip the model 102.

If the web browser extension 118 or the website 104 determines that the received tip falls within one of the input parameters, it provides the interactive interface, receives the interactive result from the interactive interface and controls the adult toy 103 actuate according to the interactive result. Alternatively, if the web browser extension 118 or the website 104 determines that the received tip falls within one of the input parameters, it signals the application 105 to provide the interactive interface, receive the interactive result from the interactive interface and control the adult toy 103 actuate according to the interactive result. It is contemplated that the received input value are credited to the model's account 117 and made redeemable by the respective model at a later time. If the web browser extension 118 determines that the received tip does not fall into any of the input parameters, the web browser extension 118 may be configured to send a notification to the user 101 indicating that the tip amount is insufficient.

In some embodiments, the web browser extension 118 or the website 104 includes a link generator 123 for generating live control links according to the interactive result and transmitting the links to users 101 that are designated by the model 102. The live control link is configured to be clicked so as to control the adult toy 103. It is contemplated that the link generator 123 includes a button that can be clicked, tapped, or otherwise activated to automatically generate new live control links, via the server 106, and cancel previously generated live control links. The model 102 can set parameters to define the duration for which the model 102 would permit the user 102 to control the model toy 103. In this way, the live control links allow certain users 101 to control the model toy 103 for a limited or an unlimited time, wherein the users 101 can control the model toy 103 via a virtual control panel 130 that is accessible when the live control link is used. The live control link may be available to the user 101 while the user 101 is in a chat session. If more than one user 101 receives a live control link, then the web browser extension 118 or the website 104 creates a queue to add additional links, for example, in the order accessed.

In other embodiments, the model device 115 can be configured to provide a remote control request to the user device 114 according to the interactive result such that the user device 114 provides a remote control signal to control the the adult toy 103 via the model device 115. It can be understood, the remote control request may be generated by a first application installed on the model device 115, the remote control request may be received by a second application installed on the model device 115, and the second application may provide the remote control signal to the first application so as to control the adult toy 103 via the model device 115.

Some embodiments of the present system include two or more users 101 A, 101 B in communication with one model 102 at the same time, wherein each of the users 101 A, 101 B operates a user device 121 A, 121 B for accessing the website 104 A, 104 B via the web browser 121 A, 121 B. In this regard, the first user 101 A and the second user 101 B can use different web browsers so that the first web browser 121 A and the second web browser 121 B need not be the same. Additionally, each user 101 A, 101 B can visit different websites to enter into an online chat session with the model 102 such that the first website 104 A and the second web site 104 B need not be the same.

In this regard, the model 102 can broadcast on multiple platforms simultaneously (referred hereto as "split-camming") so that each user 101 A, 101 B can view the model via, for example, UI 113 A, 113 B, and tip the model 102. One model and two or more users 101 A, 101 B can be in a single chat session. When multiple users 101 A, 101 B tip the model 102, the web browser extension 118 or the website 104 can form a queue and build on the interactive results received. For example, the model toy 103 can react to a first interactive result received, and then react to a second interactive result received, wherein the first interactive result is received before the second interactive result. If the first user 101 A tips and corresponds to the first interactive result and the second user 101 B tips and corresponds to the second interactive result, then the each of the users may be notified when the model toy 103 is reacting to their respective interactive results. Alternatively, one model 102 can be in multiple chat sessions with individual users 101 A, 101 B (i.e., one chat session per user). In this regard, the web browser extension 118 can scan all of the websites 104 A, 104 B simultaneously for interactive results to actuate the model toy 103 or to signal the application 105 to make the model toy 103 react based on the received interactive results.

In some embodiments, one user 101 may enter into multiple chat sessions with multiple models simultaneously. In this regard, the web browser extension 118 for each model 102 can scan for interactive results designated for that model 102 and actuate the model toy 103 belonging to the respective model 102, or signal the model's application 105 to actuate the model toy 103.

Reference is also made to FIGS. 5-8, which schematically illustrates exemplary methods of interactive online communication for adult entertainment. In some embodiments, one or more of the operations of FIGS. 5 through 8 may be performed by one or more elements of the system (e.g., web browser extension 118 (FIGS. 1, 2 and 3)).

Figure 5:
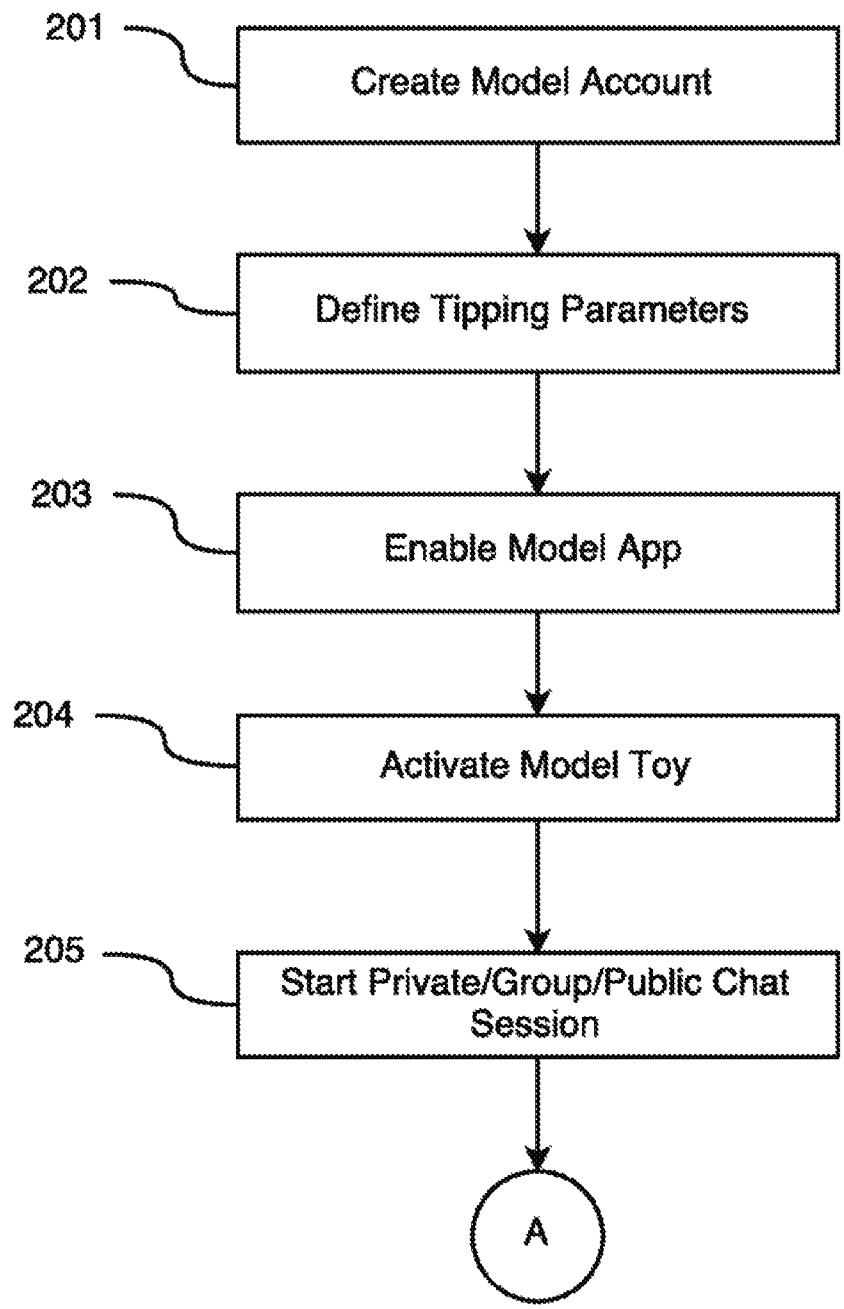
FIGS. 5 through 8 show exemplary flow charts of the present method.
Figure 6:
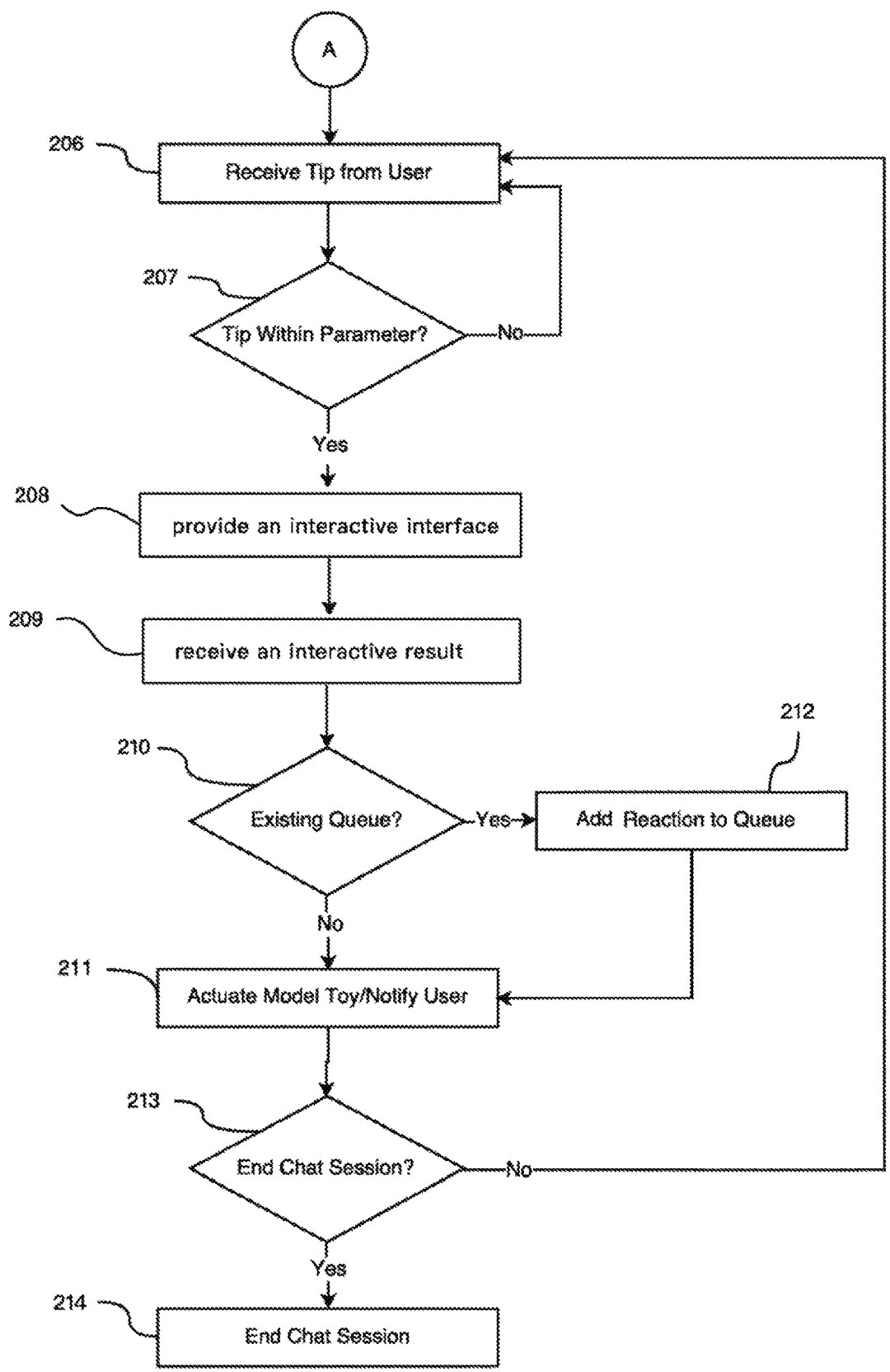

One embodiment for the present method in operation is illustrated in FIGS. 5 and 6. As indicated in block 201, the method may include creating a model account via a website 104 (FIGS. 1, 2 and 3), wherein the model account includes information associated with the model such as the model's name, age, gender, location, and the like. As indicated in block 202, the method may include defining tipping parameters via the website 104 or the web browser extension 118 (FIGS. 1, 2 and 3), wherein the tipping parameters can be determined by the model such that the parameters can vary from a model to a model, and wherein the tipping parameters include specific input value or one or more ranges of input value and acts corresponding thereto.

Optionally, as indicated in block 203, the model can enable the application 105 (FIG. 2) stored on the model device 115 (FIGS. 1, 2 and 3), if the model toy 103 (FIGS. 1, 2 and 3) is not Wi-Fi-enabled. The application 105 (FIG. 2) can activate the model toy 204 before the model enters into a chat session with a user. If the model toy is Wi-Fi-enabled 120 (FIGS. 1, 2 and 3), the application 105 (FIG. 2) may not be needed and the model toy 103 (FIGS. 1, 2 and 3) can be activated 204 via a control button (i.e., a power switch or button) disposed on the model toy 103 (FIGS. 1, 2 and 3).

As indicated in block 205, the model can start a chat session (i.e., a private session, a group session, or a public session) with a client via any online chat platform, including a third party platform. The model can receive tips from a client 206 during a chat session. When the model receives a tip, the web browser extension 118 or the website 104 (FIGS. 1, 2 and 3) determines whether the tip is within the model's input parameters 207. As indicated in blocks 208 and 209, if the tip amount received falls within one of the input parameters, an interactive interface is provided and an interactive result is received, the web browser extension 118 (FIGS. 1, 2 and 3) further determines whether there is an existing queue 210. If there is no existing queue, the model toy is actuated 211 via the application 105 (FIG. 2) of the model device 115 (FIGS. 1, 2 and 3) according to the interactive result. Alternatively, the web browser extension 118 (FIG. 1) may be configured to directly actuate the Wi-Fi-enabled 120 (FIG. 1) model toy 103 (FIG. 1). If there is a queue, the reaction corresponding to the interactive result is added to the queue 212, wherein the reaction is added in order received.

In some embodiments, if the tip does not fall within any of the input parameters or meet a specific tip amount, the web browser extension 118 (FIGS. 1, 2 and 3) can notify the user to indicate that the tip did not fall within the model's input parameters and that the user needs to adjust (i.e., increase) the tip amount. Alternatively, no interactive surfaces are taken if the tip amount does not fall within any of the tip parameter. The user can continue tipping the model until the chat session ends.

As indicated in block 213, if the model indicates that it is the end of a chat session, the chat session is ended 214. The user may or may not be able to end the chat session. For instance, the user may be able to end the chat session if the chat session is a private session. However, the user may not be able to end the chat session if the chat session is a group session or a public session. Alternatively, the chat session can automatically end 214 if the chat session is valid for only a predetermined period of time.

Exemplary steps for generating a live control link are illustrated in FIG. 6. Optionally, the model can generate a live control link via the link generator 123 (FIGS. 1, 2 and 3). If the model generates a live control link, the model can define the control parameters (e.g., amount of time a user can control the model toy) as indicated in block 215. Once the control parameters are defined, the link generator generates a live control link 216 via the server 106 (FIGS. 1, 2 and 3). The link generator may automatically cancel or invalidate previously generated links so that only valid links can be activated 217. Alternatively, the link generator may create a queue if more than one live control links is distributed to multiple users 217. The generated links are transmitted to users 218 via various messaging systems, for example, by email. The live control link can be configured to be clicked so as to control the adult toy 103 and can be used while the user is in a chat session (i.e., a private session, a group session, or a public session) or when the user is not in a chat session.

Figure 7:
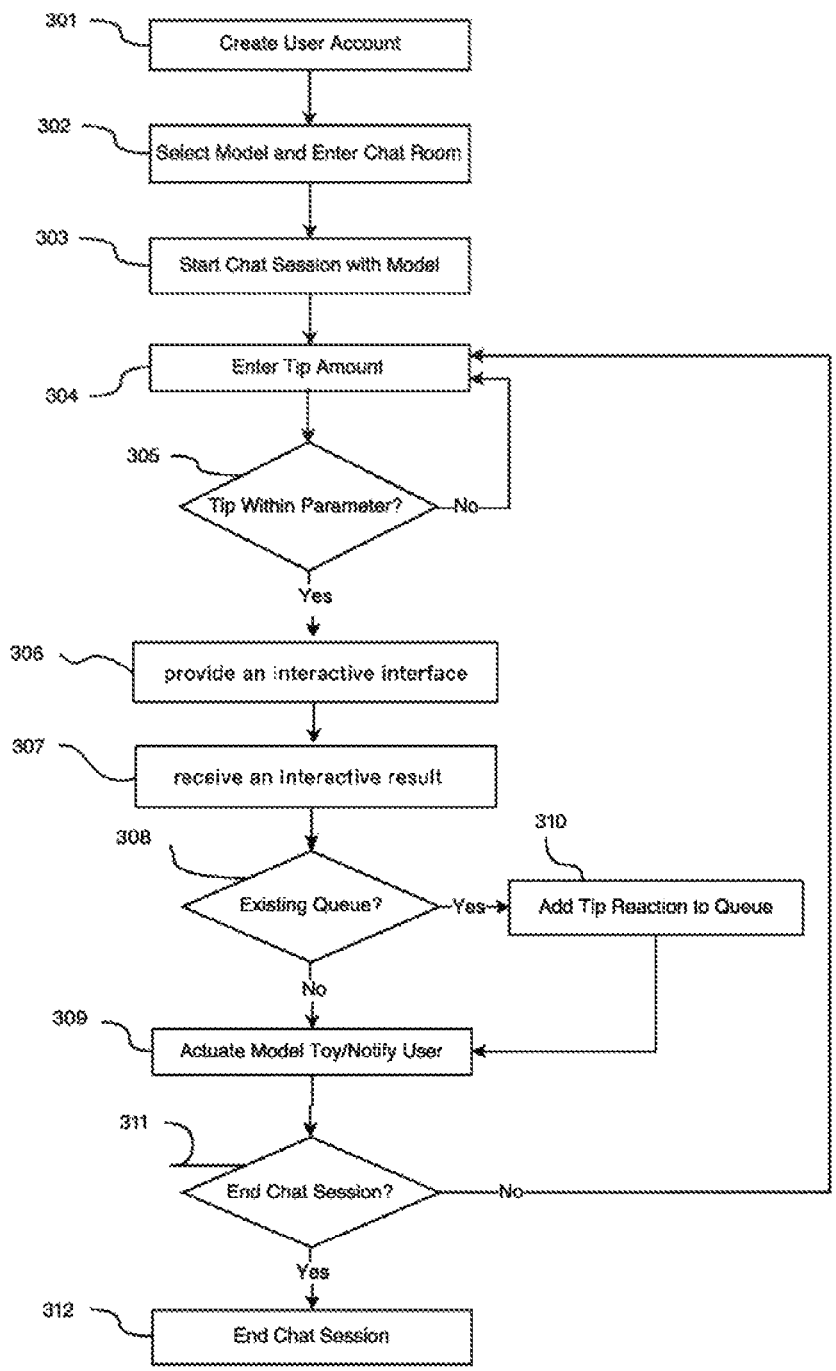

Another embodiment for the present method in operation is illustrated in FIG. 7. As indicated in block 301, the method further includes creating a user or a client account via a website 104 (FIGS. 1, 2 and 3), wherein the user account includes user name and password and input payment information, among other types of information associated with the user. As indicated in block 302, the user can select a model from a group of models to enter into a chat session and then begin a chat session with a model 303, wherein the chat session can be private, group, or public. Additionally, it is noted that one or more users may already be in a chat room, the chat room can be empty, or the model and the user can enter the chat room simultaneously.

As indicated in block 304, the user can enter a tip amount via the UI 113 (FIGS. 1, 2 and 3) of the website 104 (FIGS. 1, 2 and 3) during the chat session, for example, by typing in the amount of tip within a conversation thread, or by selecting a tip amount from a drop down menu. In some embodiments, the model's input parameters may be made available to the user during the chat session so that the user can view the input parameters and tip the model accordingly. In some embodiments, the user can tip the model anonymously, for example, during a group session. As indicated in block 305, the web browser extension 118 or the website 104 (FIGS. 1, 2 and 3) determines whether the user paid the correct tip amount (i.e., a tip amount that falls within one of the input parameters defined by the model). If the user did not tip the correct amount, the web browser extension 118 (FIGS. 1, 2 and 3) can optionally notify the user to adjust the tip amount. Alternatively, the web browser extension 118 may not take any actions until the correct tip amount is input.

As indicated in blocks 306 and 307, if the correct tip amount is inputted, the web browser extension 118 (FIG. 1) or the website 104 controls the model device 115 provide an interactive interface, and then an interactive result from the interactive interface is received, the web browser extension 118 (FIG. 1), the website 104 or the model device 115 determines whether there is an existing queue 308. As indicated in block 309, if there is no existing queue, the web browser extension 118 determines the corresponding predetermined act based on the interactive result and actuates the Wi-Fi-enabled 120 (FIG. 1) model toy 103 (FIG. 1) or the web browser extension 118 or the website 104 signals the application 105 (FIG. 2) to actuate the model toy 103 (FIG. 2). If there is an existing queue, the web browser extension 118 (FIG. 1) adds an reaction corresponding to the interactive result to queue 310. The user can continue chatting with the model and tip the model until the end of the chat session 311. In this regard, either the user and/or the model can end the chat session 312, or the chat session may be automatically ended after a predetermined period of time.

Figure 8:
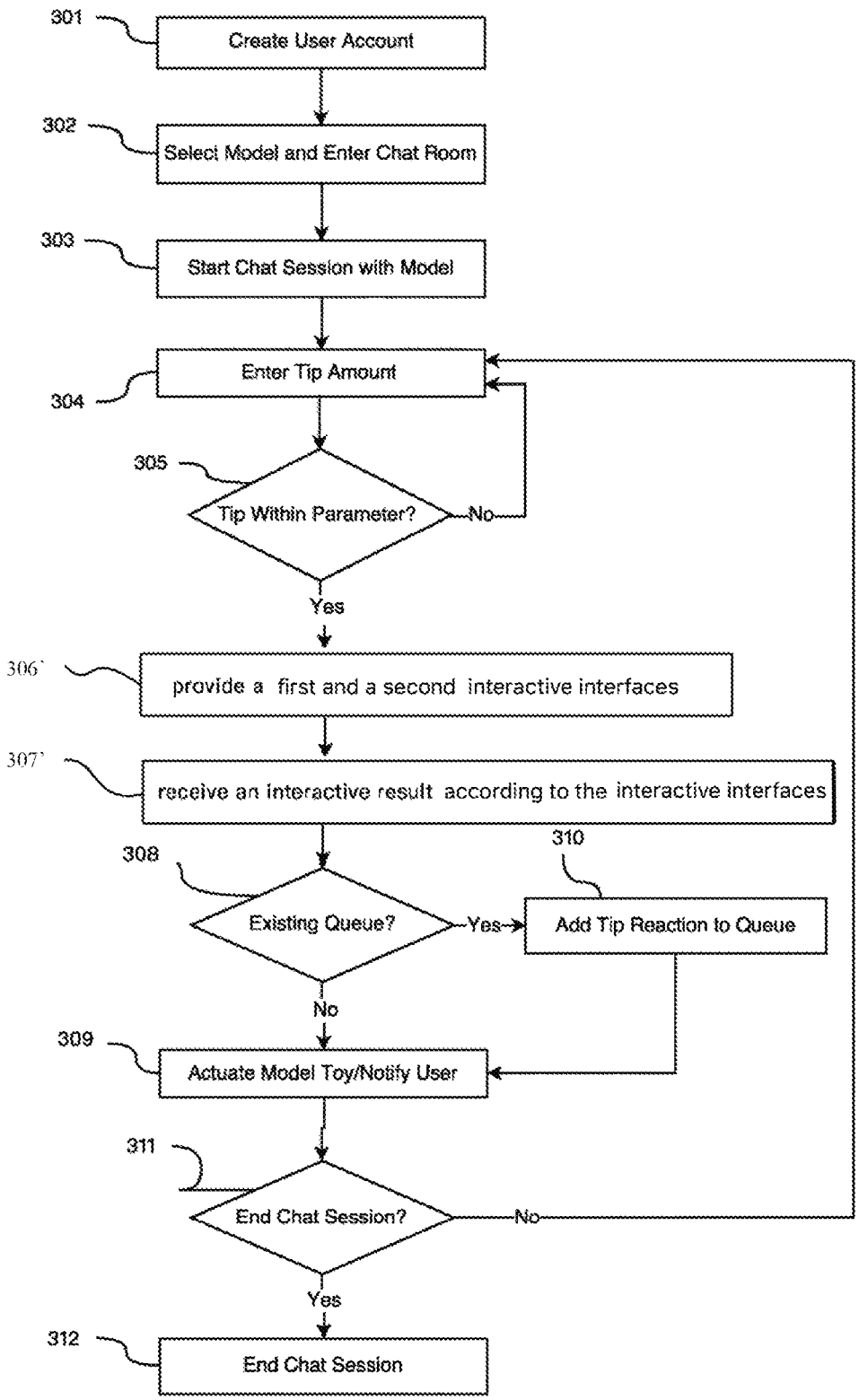
Figure 9:
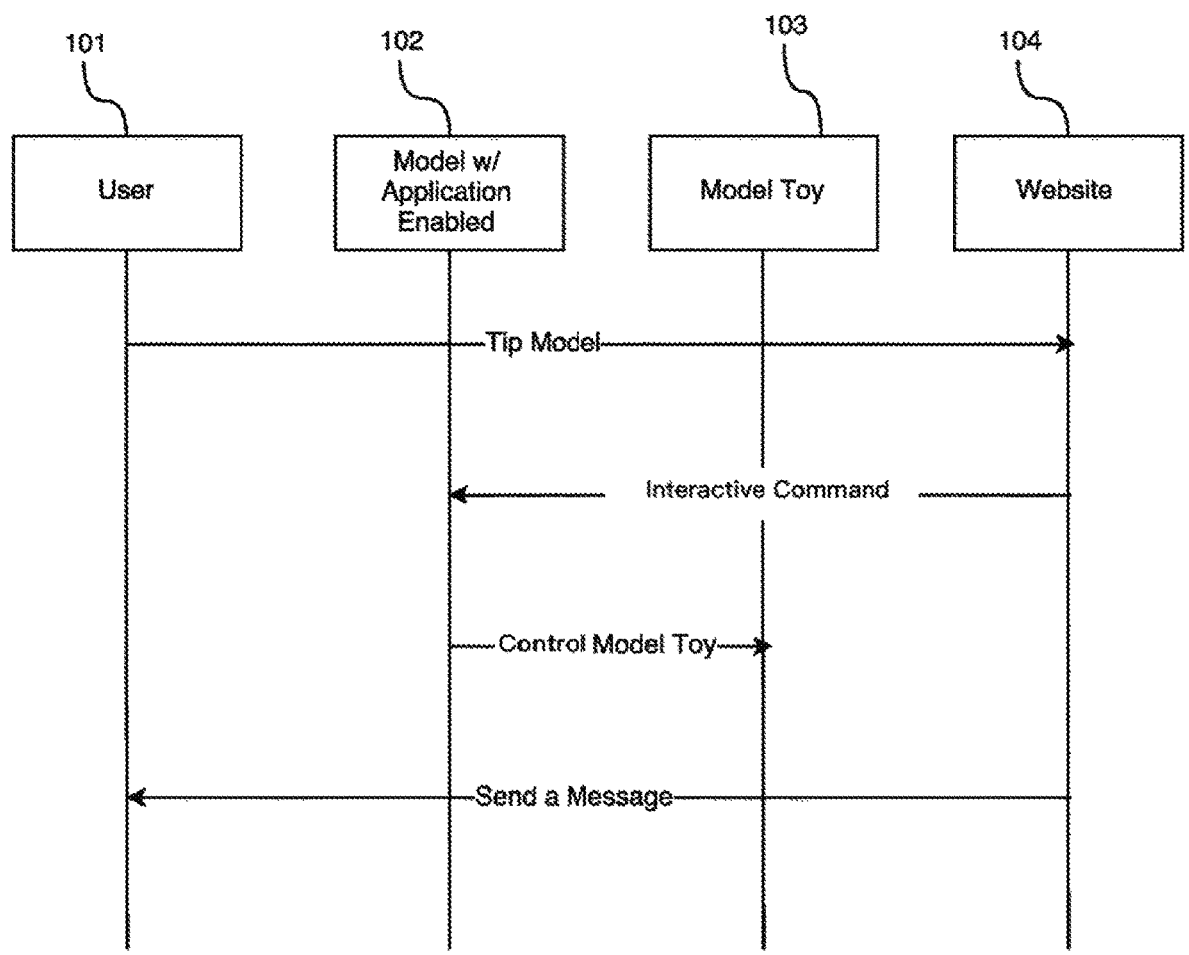
FIGS. 9 through 14 show exemplary diagrams of various embodiments of the present invention.
Figure 10:
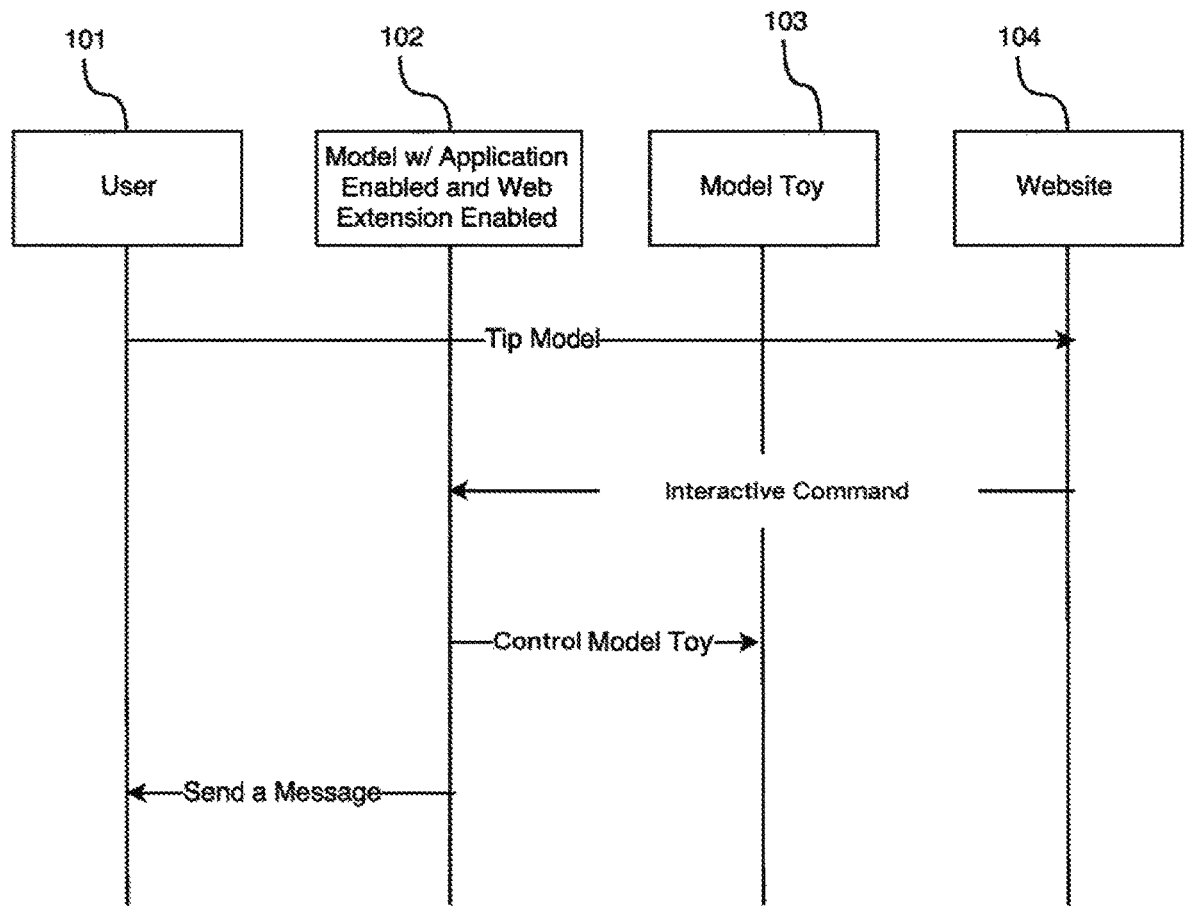
Figure 11:
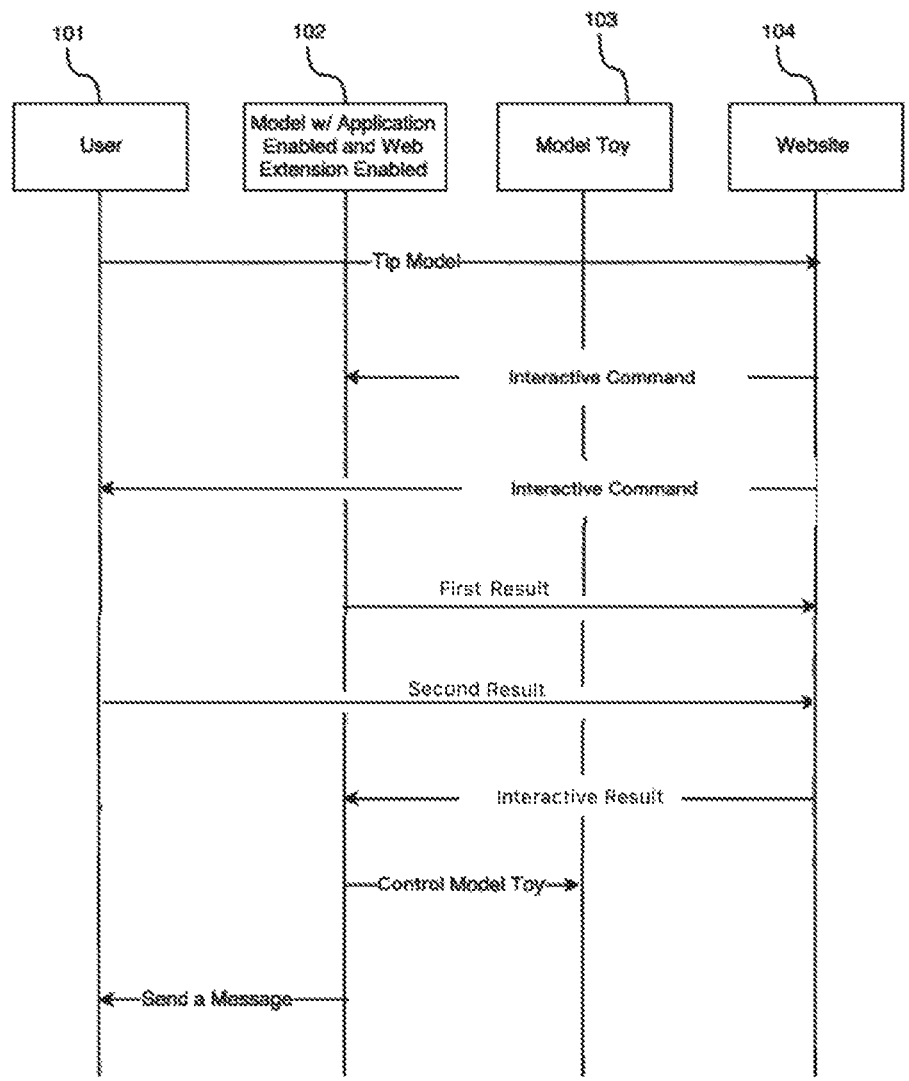
Figure 12:
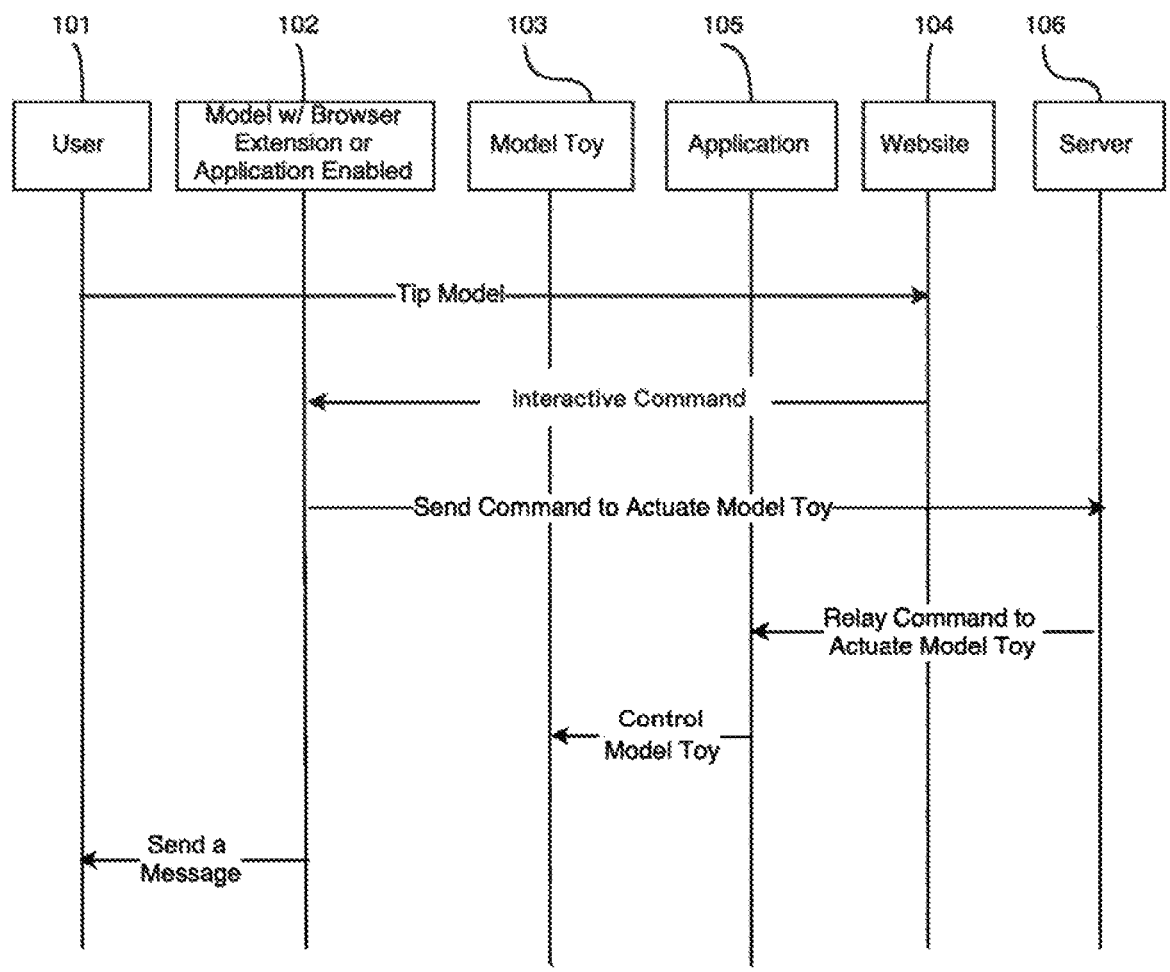
Figure 13:
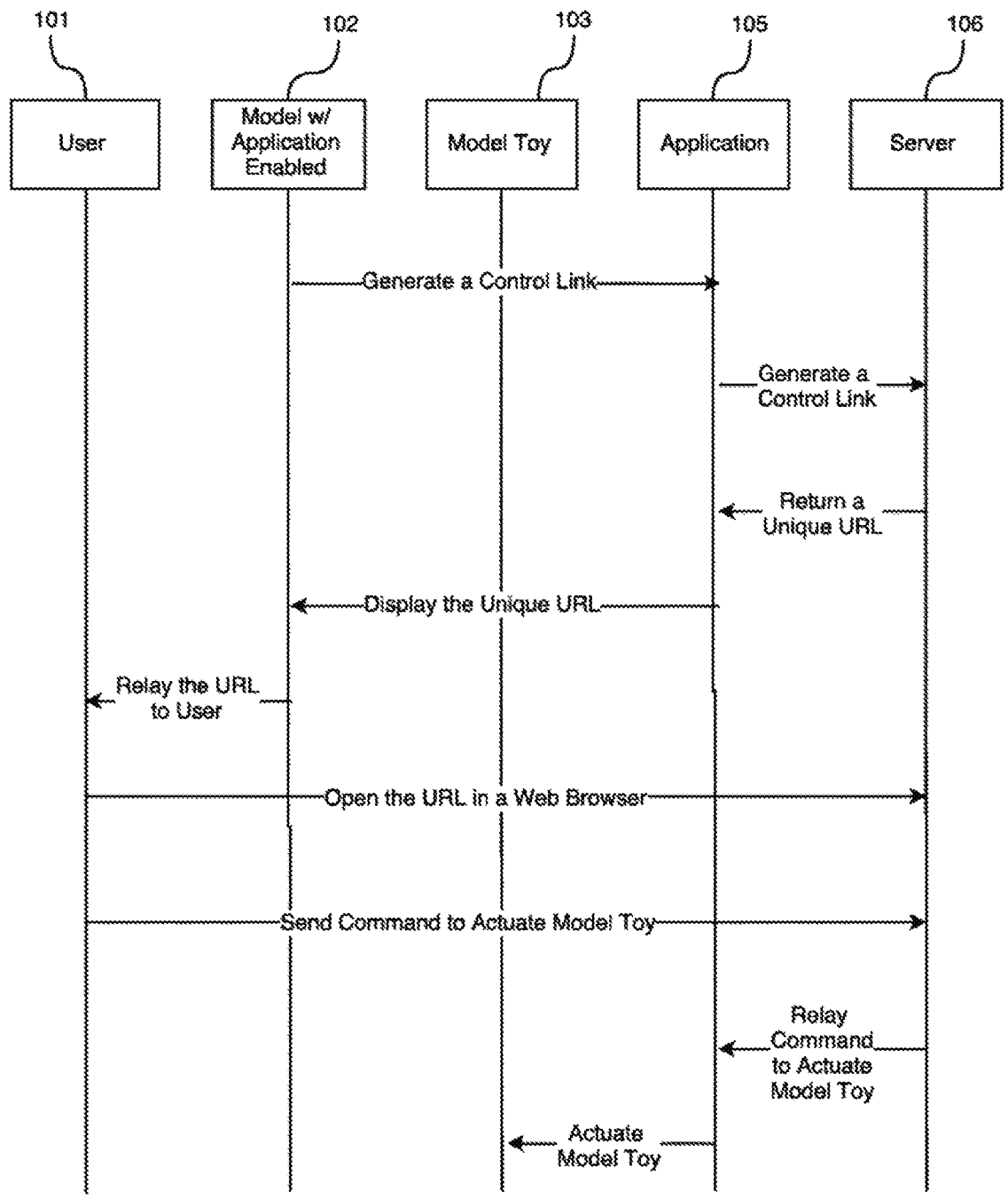
Figure 14:
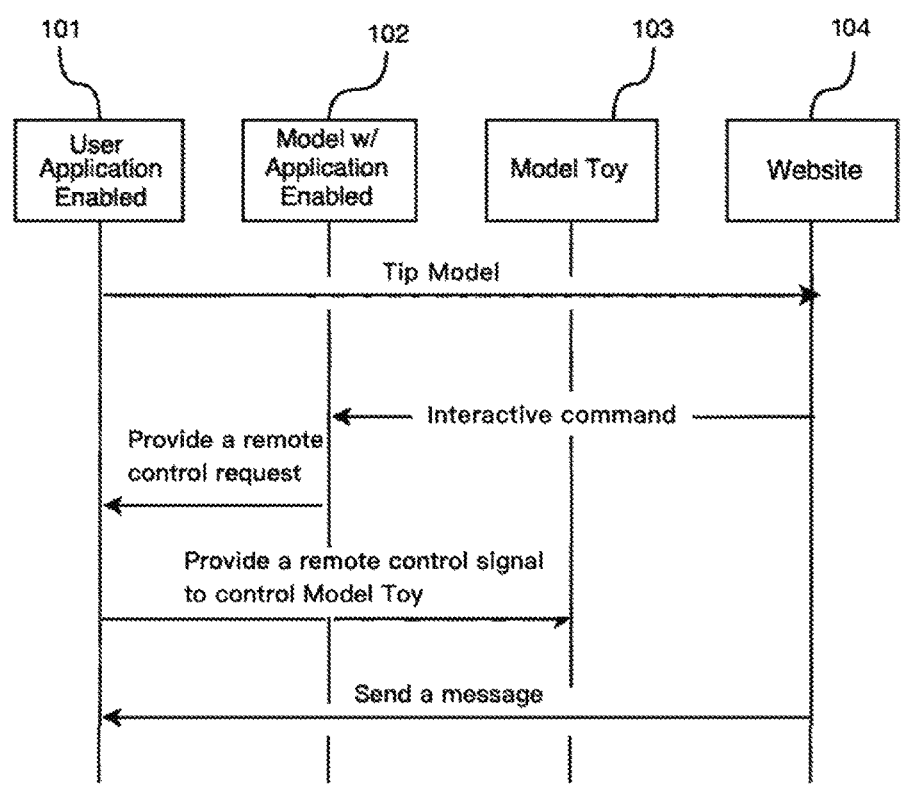

Another embodiment for the present method in operation is illustrated in FIG. 8. As indicated in block 301, the method further includes creating a user or a client account via a website 104 (FIGS. 1, 2 and 3), wherein the user account includes user name and password and input payment information, among other types of information associated with the user. As indicated in block 302, the user can select a model from a group of models to enter into a chat session and then begin a chat session with a model 303, wherein the chat session can be private, group, or public. Additionally, it is noted that one or more users may already be in a chat room, the chat room can be empty, or the model and the user can enter the chat room simultaneously.

As indicated in block 304, the user can enter a tip amount via the UI 113 (FIGS. 1, 2 and 3) of the website 104 (FIGS. 1, 2 and 3) during the chat session, for example, by typing in the amount of tip within a conversation thread, or by selecting a tip amount from a drop down menu. In some embodiments, the model's input parameters may be made available to the user during the chat session so that the user can view the input parameters and tip the model accordingly. In some embodiments, the user can tip the model anonymously, for example, during a group session. As indicated in block 305, the web browser extension 118 or the website 104 (FIGS. 1, 2 and 3) determines whether the user paid the correct tip amount (i.e., a tip amount that falls within one of the input parameters defined by the model). If the user did not tip the correct amount, the web browser extension 118 (FIGS. 1, 2 and 3) can optionally notify the user to adjust the tip amount. Alternatively, the web browser extension 118 may not take any actions until the correct tip amount is input.

As indicated in blocks 306' and 307', if the correct tip amount is inputted, the web browser extension 118 (FIG. 1) or the website 104 controls the model device 115 provide a first interactive interface and controls the user device 114 provide a second interface, and then an interactive result according to a first result from the first interactive interface and a second result from the second interactive interface is received, the web browser extension 118 (FIG. 1), the website 104 or the model device 115 determines whether there is an existing queue 308. As indicated in block 309, if there is no existing queue, the web browser extension 118 determines the corresponding predetermined act based on the interactive result and actuates the Wi-Fi-enabled 120 (FIG. 1) model toy 103 (FIG. 1) or the web browser extension 118 or the website 104 signals the application 105 (FIG. 2) to actuate the model toy 103 (FIG. 2). If there is an existing queue, the web browser extension 118 (FIG. 1) adds an reaction corresponding to the interactive result to queue 310. The user can continue chatting with the model and tip the model until the end of the chat session 311. In this regard, either the user and/or the model can end the chat session 312, or the chat session may be automatically ended after a predetermined period of time.

References are now made to FIGS. 9 through 14, which show exemplary diagrams of various embodiments of the present invention. In some embodiments, the user 101 can tip the model via the website 104, for example, by inputting the tip amount in a chat room. The model's UI 102 or the model toy 103 is notified of the tip via the web browser extension or the website. The website 104 provides an interactive interface or provides an interactive command to control the model's UI 102 provide an interactive interface. When the interactive result is generated from the interactive interface and the model toy 103 is actuated, the user 101 can receive an automated message via the website 104, wherein the message includes a thank you message or a predetermined message customized by the model 102. In other embodiments, the website 104 provides a first interactive interface and a second interactive interface or provides an interactive command to control the model's UI 102 provide a first interactive interface and the user 101 provide a second interactive interface. When an interactive result is generated by the website 104 according to a first result from the first interactive interface and a second result from the second interactive interface, and the model toy 103 is actuated according to the interactive result, the user 101 can receive an automated message via the website 104, wherein the message includes a thank you message or a predetermined message customized by the model 102.

In some embodiments, the model 102 may operate a model device having an application installed thereon, wherein the application is configured to automatically actuate the model toy 103 when it receives the interactive result.

In some embodiments, the present system further includes a server 106, wherein the model, via the application enabled on the model device, is configured to send command to the server 106 to actuate the model toy 103 according to the interactive result, and further wherein the server 106 is configured to relay the command to actuate the model toy 103. When the interactive result is received, the web browser extension is configured to send an automated message to the user 101 as described above.

In some embodiments, the model 102 can generate a live control link via the application 105, which triggers the server 106 to output a unique Uniform Resource Locator (URL) via the browser or the website and relay it back to the application 105 to display it on its UI. The model 102 can relay the URL (i.e., the live control link) to the user 101. The user can open the URL in a web browser and access a control panel to control the model toy. The user is not required to tip the model when using the control panel. When the user enters a command to actuate the model toy, the server 106 relays the command back to the application 105 in order to actuate the model toy.

In other embodiments, the model device 115 can provide a remote control request to the user device 114 according to the interactive result such that the user device 114 provides a remote control signal to control the adult toy 103 via the model device 115.

It can be understood, the remote control request may be generated by a first application installed on the model device 115, the remote control request may be received by a second application installed on the model device 115, and the second application may provide the remote control signal to the first application so as to control the adult toy 103 via the model device 115.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for providing online communication, comprising:
    an operable adult toy configured to receive signals;
    a memory having stored thereon instructions;
    at least one processor to execute said instructions resulting in a software application; said software application configured to:
    define input parameters;
    receive an input from one or more users; and
    providing at least one interactive interface, outputting randomly an interactive result according to the at least one interactive interface, receiving the interactive result and controlling said adult toy to actuate according to the interactive result.

2. The system of claim 1, wherein said input parameters comprise one or more ranges of input value, said input comprises virtual currency, the software application is configured to determine whether said input falls within said one or more ranges;
    if said input falls within said input parameters, providing at least one interactive interface, outputting randomly an interactive result according to the at least one interactive interface, receiving the interactive result and controlling said adult toy to actuate according to the interactive result.

3. The system of claim 2, wherein if said input falls within said input parameters, provides a first interactive interface and a second interactive interface, outputs randomly a first result from the first interactive interface, outputs randomly a second result from the second interactive interface, and outputs randomly the interactive result according to the first result and the second result.

4. The system of claim 1, wherein the interactive interface provides a selected one online game from the group of a finger guessing game, a dice game and a lottery game, the interactive result is randomly generated from a plurality of predefined results according to said online game, said adult toy comprises a plurality of different modes corresponding to the plurality of predefined results.

5. The system of claim 4, wherein the plurality of modes comprises a first mode of no actuating, a second mode of actuating for a first time period at a first actuating speed and a third mode of actuating for a second time period at a second actuating speed, the third mode is different from the second mode, wherein the plurality of modes further comprises a fourth mode of actuating for a third time period at the first actuating speed and actuating for a fourth time period at the second actuating speed.

6. The system of claim 4, wherein said input parameters comprise a first range of input value, a second range of input value, and a third range of input value, the input value of the second range are greater than the input value of the first range and less than the input value of the third range,
    if said input falls within said input parameters of the first range, the at least one interactive interface provides a first online game from the group of the finger guessing game, the dice game and the lottery game;
    if said input falls within said input parameters of the second range, the at least one interactive interface provides a second online game from the group of the finger guessing game, the dice game and the lottery game; and
    if said input falls within said input parameters of the third range, the at least one interactive interface provides a third online game from the group of the finger guessing game, the dice game and the lottery game.

7. The system of claim 6, wherein in each range of input value, the plurality of predefined results comprises a plurality of different prizes respectively, and a probability to win a bigger prize from the plurality of different prizes is improved with increase of said input.

8. The system of claim 1, wherein said adult toy is Wi-Fi-enabled or Bluetooth-enabled, the system further comprises a model device having an application installed thereon, wherein said application is configured to send commands to said adult toy to control said adult toy.

9. The system of claim 8, wherein said model device is configured to provide the interactive interface, receive the interactive result from the interactive interface and control said adult toy according to the interactive result.

10. The system of claim 1, wherein said software application comprises a link generator for generating a live control link according to the interactive result, said live control link configured to be clicked so as to control said adult toy, further wherein said live control link comprises a unique Uniform Resource Locator (URL), said link generator is configured to invalidate previously generated live control link or to build a queue of multiple links.

11. A system for providing online communication, comprising:
    one or more user devices and a model device in connection with a network;
    each of said one or more user devices and said model device having a web browser thereon for accessing a website, said website providing an online chat room;
    an adult toy in communication with said model device;
    said web browser comprising a software application, said software application configured to:

define input parameters, wherein said input parameters comprise one or more ranges of input value;

receive an input from one or more users, wherein said input comprises virtual currency;

determine whether said input falls within said one or more ranges; and if said input falls within said input parameters, providing an interactive command to at least one of said model device and said user device, the at least one of said model device and said user device configured to provide an interactive interface according to the interactive command, outputting randomly an interactive result according to the interactive interface, receive the interactive result from the interactive interface and control said adult toy according to the interactive result.

12. The system of claim 11, wherein if said input falls within said input parameters, said web browser provides the interactive command to the model device, said model device provides the interactive interface according to the interactive command and outputs randomly the interactive result according to the interactive interface, said web browser receives the interactive result from the interactive interface and controls said adult toy according to the interactive result.

13. The system of claim 11, wherein if said input falls within said input parameters, said web browser provides the interactive command to said model device and said user device, said model device provides a first interactive interface according to the interactive command and outputs randomly a first result according to the first interactive interface, said user device provides a second interactive interface according to the interactive command and outputs randomly a second result according to the second interactive interface, said web browser outputs randomly the interactive result according to the first result and the second result and controls said adult toy according to the interactive result.

14. The system of claim 11, wherein the interactive interface provides a selected one online game from the group of a finger guessing game, a dice game and a lottery game, the interactive result is randomly generated from a plurality of predefined results according to said online game, said adult toy comprises a plurality of different modes corresponding to the plurality of predefined results.

15. The system of claim 14, wherein the plurality of modes comprises a first mode of no actuating, a second mode of actuating for a first time period at a first actuating speed and a third mode of actuating for a second time period at a second actuating speed, the third mode is different from the second mode, wherein the plurality of modes further comprises a fourth mode of actuating for a third time period at the first actuating speed and actuating for a fourth time period at the second actuating speed.

16. The system of claim 11, wherein said input parameters comprise a first range of input value, a second range of input value, and a third range of input value, the input value of the second range are greater than the input value of the first range and less than the input value of the third range, if said input falls within said input parameters of the first range, the at least one interactive interface provides a first online game from the group of the finger guessing game, the dice game and the lottery game;

if said input falls within said input parameters of the second range, the at least one interactive interface provides a second online game from the group of the finger guessing game, the dice game and the lottery game; and if said input falls within said input parameters of the third range, the at least one interactive interface provides a third online game from the group of the finger guessing game, the dice game and the lottery game.

17. The system of claim 16, wherein in each range of input value, the plurality of predefined results comprises a plurality of different prizes respectively, and a probability to win a bigger prize from the plurality of different prizes is improved with increase of said input.

18. The system of claim 11, wherein one of said model device and said website comprises a link generator for generating a live control link according to the interactive result, said live control link configured to be clicked so as to control said adult toy, further wherein said live control link comprises a unique Uniform Resource Locator (URL), said link generator is configured to invalidate previously generated live control link or to build a queue of multiple links.

19. The system of claim 11, wherein said model device is also configured to provide a remote control request to the user device such that the user device provides a remote control signal to control the said adult toy via said model device.

20. A computer based method for providing adult entertainment online, comprising the steps of:

defining input parameters, wherein said input parameters comprise one or more ranges of input value;

activating an adult toy in communication with a model device;

starting a chat session with one or more users and a model via a website;

receiving an input from said one or more users, wherein said input comprises virtual currency;

determining whether said input falls within said input parameters;

if said input falls within said input parameters, providing at least one interactive interface, outputting randomly an interactive result according to the at least one interactive interface, receiving the interactive result and controlling said adult toy to actuate according to the interactive result.

* * * * *

(12) POST-GRANT REVIEW CERTIFICATE (273rd)
United States Patent
He

(10) Number: US 11,134,041 J1
(45) Certificate Issued: Apr. 1, 2024

(54) SYSTEM AND METHOD FOR INTERACTIVE ONLINE ENTERTAINMENT

(71) Applicant: Minchao He

(72) Inventor: Minchao He

(73) Assignee: SHENZHEN SVAKOM TECHNOLOGY CO., LTD

Trial Number:

PGR2022-00050 filed Jun. 27, 2022

Post-Grant Review Certificate for:

Patent No.: 11,134,041
Issued: Sep. 28, 2021
Appl. No.: 17/087,652
Filed: Nov. 3, 2020

The results of PGR2022-00050 are reflected in this post-grant review certificate under 35 U.S.C. 328(b).

POST-GRANT REVIEW CERTIFICATE
U.S. Patent 11,134,041 J1
Trial No. PGR2022-00050
Certificate Issued Apr. 1, 2024

AS A RESULT OF THE POST-GRANT REVIEW PROCEEDING, IT HAS BEEN DETERMINED THAT:

Claims 1-20 are cancelled.

\* \* \* \* \*